United States Patent [19]
Hayashi

[11] 3,936,875
[45] Feb. 3, 1976

[54] METHOD OF ADDRESSING MAGNETIC MEMORY

[75] Inventor: Yukitaka Hayashi, Hitachi, Japan

[73] Assignee: Hitachi, Ltd., Japan

[22] Filed: Feb. 2, 1973

[21] Appl. No.: 329,093

[30] Foreign Application Priority Data
Feb. 4, 1972   Japan................................ 47-12218

[52] U.S. Cl.................................... 360/48; 360/49
[51] Int. Cl.²........................................... G11B 5/09
[58] Field of Search.............. 360/48, 49, 40, 39, 50

[56] References Cited
UNITED STATES PATENTS

| | | | |
|---|---|---|---|
| 3,375,507 | 3/1968 | Gleim et al. ................... | 340/174.1 J |
| 3,399,394 | 8/1968 | Smith.................................... | 360/48 |
| 3,631,421 | 12/1971 | Perkins ......................... | 340/174.1 J |
| 3,701,130 | 10/1972 | Ault.............................. | 340/174.1 J |

*Primary Examiner*—Vincent P. Canney
*Attorney, Agent, or Firm*—Craig & Antonelli

[57] ABSTRACT

In a magnetic memory which has thereon $2^q$ tracks ($q$ ⩾ 2x positive integer) and in which each band consists of $2^p$ sectors ($p$ ⩾ 2x positive integer) and the addressing of the magnetic memory is performed by addressing the bands and sectors, each track is designed to contain a plurality of bands so that one band can be constituted by $2^p$ sectors while each track contains sectors whose number is not equal to $2^{p'}$ ($p'$ = positive integer).

15 Claims, 5 Drawing Figures

| Band Number | | | Track Number |
|---|---|---|---|
| 0 | n | 2n | 0 |
| 2n+1 | 1 | n+1 | 1 |
| n+2 | 2n+2 | 2 | 2 |
| 3 | n+3 | 2n+3 | 3 |
| 2n+4 | 4 | n+4 | 4 |
| n+5 | 2n+5 | 5 | 5 |
| 6 | n+6 | 2n+6 | 6 |
| 2n+7 | 7 | n+7 | 7 |
| n+8 | 2n+8 | 8 | 8 |
| ⋮ | ⋮ | ⋮ | ⋮ |
| 2n−3 | 3n−3 | n−3 | n−3 |
| n−2 | 2n−2 | 3n−2 | n−2 |
| 3n−1 | n−1 | 2n−1 | n−1 |
| ↓ | ↓ | ↓ | |
| Block 1 | Block 2 | Block 3 | |

METHOD OF ADDRESSING MAGNETIC MEMORY

BACKGROUND OF THE INVENTION

1. Field of the Invention

The present invention relates to an addressing method and more particularly to a method well adapted for a sector type of magnetic-drum or magnetic-disc memory.

Today, mainly for economic reasons, it is desired to multiply recording densities double or threefold and many attempts have been made for this purpose. However, in case of, for example, threefold multiplication of the recording density, there arises an inconvenience that one band cannot be made up of $2^p$ sectors ($p =$ positive integer). Hence, there is a need for a completely new method of addressing. Generally, in a system such as a process control computer system wherein real time response has an important significance, it is necessary to freely run a plurality of subprograms or data. Therefore, a sector type device is most preferable in recording in a magnetic-drum memory.

2. Description of the Prior Art

In a conventional data arrangement, $k$ bits (for example, 16 bits + one parity bit) make up one word, $l$ words (for example, 16 words) constitute one sector and $m$ sectors (for example, 64 sectors) complete one band. Each band corresponds to one track on the magnetic drum and the drum contains $n$ bands (for example, 512 bands), that is, $n$ tracks. In this case, the bands are spatially selected while the sectors, words and bits are selected in time sequence. The smallest units into or out of which data are written or read, are sectors and the specification of addresses by the processor is performed according to serial binary codes corresponding to the whole sectors. In the case where the specification of an address is performed with 15 bits in the controller of the magnetic-drum memory device, the lower 6 bits address are set as sector address on a sector register and then selected in time sequence by a sector counter and a coincidence circuit. On the other hand, the upper 9 bits are set on a band register to spatially select a desired track by means of a matrix made up of X- and Y-switches. In the above-described arrangement, one band comprises sectors whose number is equal to $2^p$. Therefore, even if one band can be technically allocated by 100 sectors, 36 (= 100 − 64) sectors are left unused as an idle area since the specification of sector addresses by 6 bits enables the addressing of only $2^6 =$ 64 sectors. In the case where it is desired to utilize 7 bits for the specification of sector addresses, $2^7 = 128$ sectors must be provided in one band. Therefore, such an addressing cannot be performed in the case of the allocation of 100 sectors in one band.

SUMMARY OF THE INVENTION

The main object of the present invention is to provide a new addressing method in which sectors left unused as idle area in the prior art method can be effectively used.

Another object of the present invention is to provide an addressing method by means of which addressable area can be increased so that the cost per capacity of the magnetic memory device is considerably lowered.

One feature of the present invention which has been made to attain the above objects, is that the number of sectors in each band and the number of tracks are equal to $2^p$ and $2^q$ ($p, q =$ positive integer) while each track contains a plurality of bands.

Another feature of the present invention is that each track contains M bands (M > 2) and each band consists of $2^p$ sectors which are respectively arranged M − 1 sectors apart on the corresponding track so that the tracks are selected according to the several lower bits of a register for specifying the band addresses while the bands on each track are selected according to the several upper bits of the register.

A further feature of the present invention is that each track contains M bands, each band consists of $2^p$ sectors which are successively arranged on the corresponding track, the addressing of the bands is performed in such a manner that one band address is designated on a 1/M circumference of the corresponding track while the next band address is designated on the next 1/M circumference of the next track, and a register for specifying the band addresses selects not only any one of the tracks but also any one of M bands on one track.

Other objects and features of the present invention will be apparent from the following description along with the attached drawings.

DESCRIPTION OF THE PREFERRED EMBODIMENTS

Figure 1:
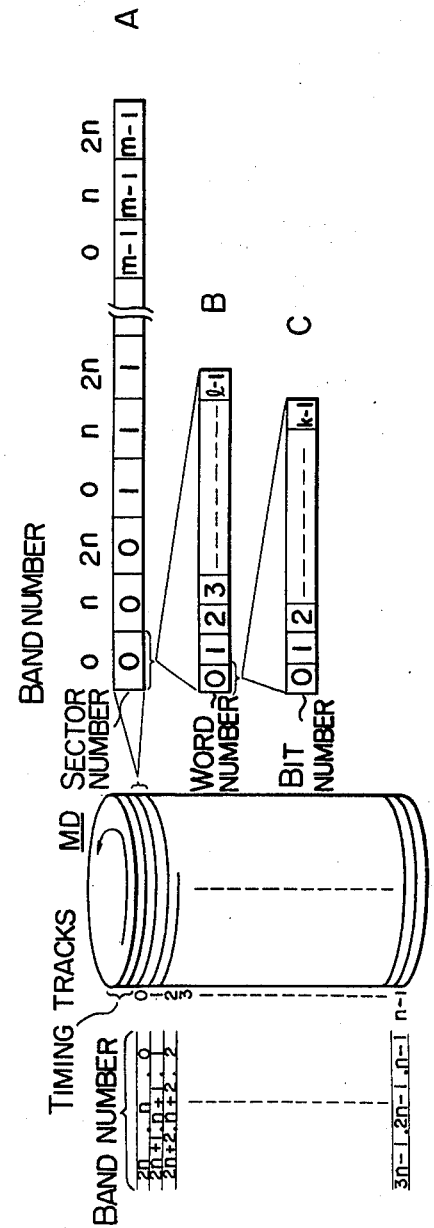
FIG. 1 shows the arrangement of data stored on a magnetic drum, according to the addressing method embodying the present invention.

In FIG. 1, it is shown how data is stored on the magnetic drum, according to the present method. FIG. 1 shows the details of a magnetic drum MD having $n$ tracks (tracks No. 0 to No. $n$), each track consisting of three bands (M = 3), and two additional timing tracks.

The details of the track No. 0 is shown in FIG. 1 as a length of ribbon labeled A. The track No. 0 consists of bands 0, $n$ and 2$n$, each band consisting of $m$ sectors ($m = 2^p$, $p =$ positive integer) and each sector consisting of $l$ words as shown in FIG. 1 as a short length of ribbon labeled B and each word being constituted of $k$ bits as indicated with ribbon labeled C in FIG. 1. The band 0 of the track No. 0 is constituted of $m$ sectors, i.e. sectors 0, 1, . . . , $m$−1, which are respectively arranged two sectors apart. In the intermediate and sequential sector areas except sector areas belonging to the band 0, sectors 0, 1, . . . , $m$−1 of each of the bands $n$ and 2$n$ are arranged two sectors apart.

In like manner, bands 1, $n$+1 and 2$n$+1 are arranged on the track No. 1. Generally speaking, bands $\alpha$, $n$+$\alpha$ and 2$n$+$\alpha$ ($\alpha = 0, 1, \ldots, n-1$) are arranged on the track No. $\alpha$.

In a conventional magnetic drum in which each track has only one band and consists of 100 sectors, 64 sectors constitutes one band and the remaining 36 sectors are left unused as idle area. However, in the method according to the present invention in which for example, each of tracks on the magnetic drum has three bands and consists of 100 sectors and each band consists of $2^5 = 32$ sectors, the idle area is $100 - 32 \times 3 = 4$ sectors and can be rendered considerably smaller though each band consists of $2^p$ sectors, $p$ being 5 in FIG. 1.

Figure 2:
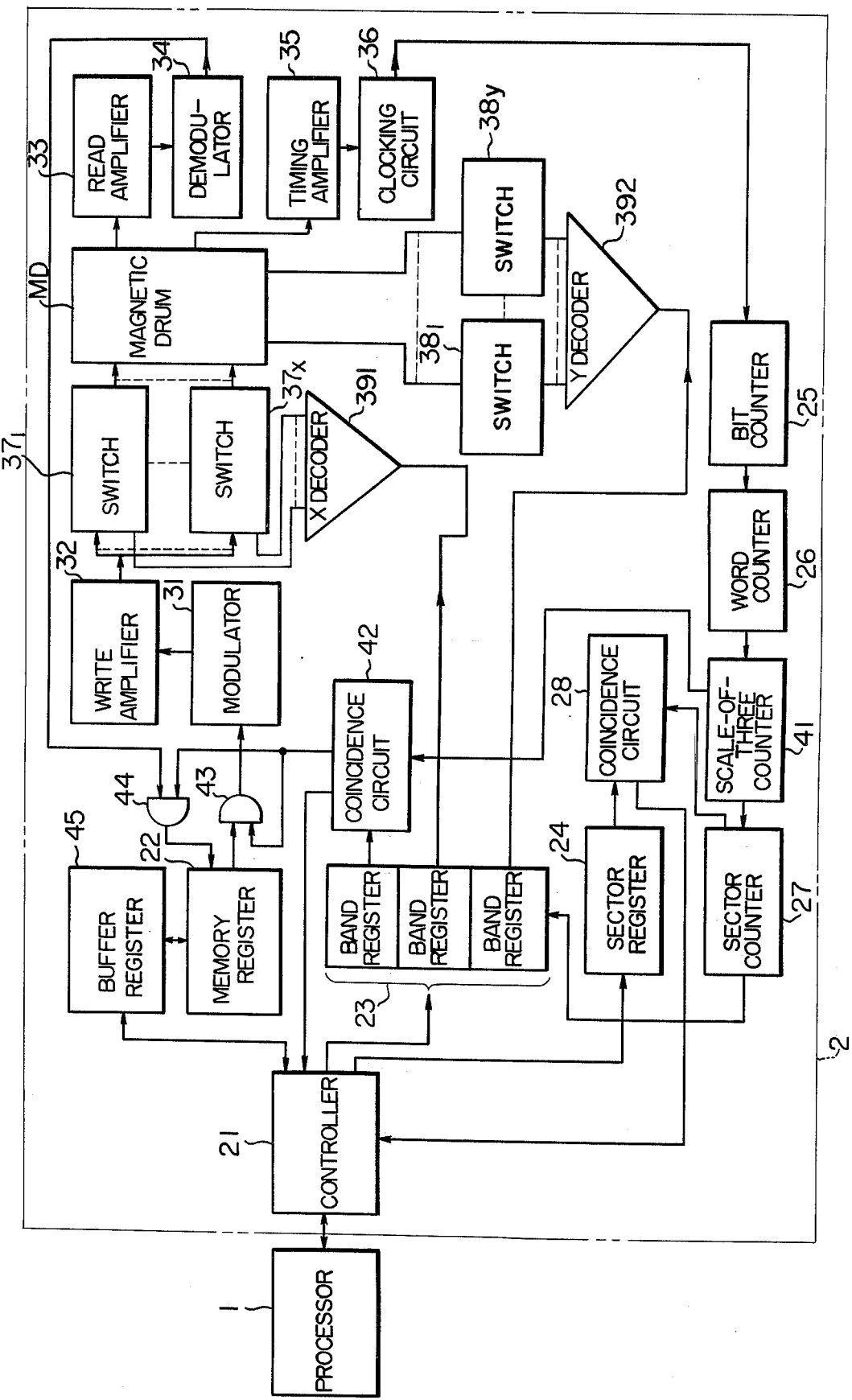
FIG. 2 is the block diagram of a circuit for realizing such a data arrangement as shown in FIG. 1.

FIG. 2 is a block diagram of a circuit for addressing data stored on such a magnetic drum as shown in FIG. 1.

In FIG. 2, reference numeral 1 indicates a processor and 2 a magnetic-drum storage device containing a magnetic drum MD. A controller 21 of the magnetic-drum storage device performs the control of data transfer to and from the processor 1 and the control of all the following components.

A memory register 22 serves to temporarily store the data transferred in parallel from a buffer memory 45 and to send the data serially to a modulator 31 and it also has the functions of temporarily storing the serial data from a demodulator 34 and transferring the data in parallel through the buffer register 45 to the controller 21.

Figures 3, 4:
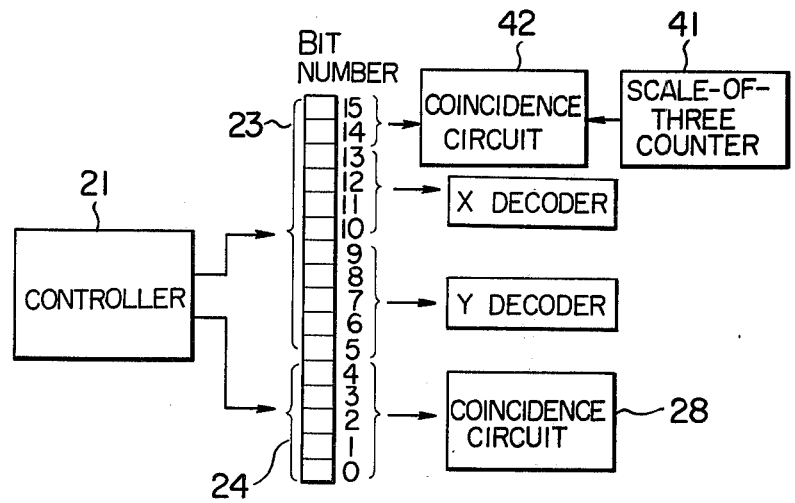
FIG. 3 shows the arrangement of bits constituting address data, used in the present method.
FIG. 4 shows another arrangement of data stored on the magnetic drum according to the present method.

A band register 23, an example of which is shown in FIG. 3, serves to store the upper bits, capable of being spatially selected, of the address information transferred from the controller 21. Reference numerals $37_1$ to $37_x$ indicate X switches, numerals $38_1$ to $38_y$ Y switches, numeral 391 an X decoder, and numeral 392 a Y decoder. In practice, the bits No. 5 to No. 9 of the band register 23 corresponding to the Y decoder 392 and the bits No. 10 to No. 13 corresponding to the X decoder 391 are used to select a desired track and the bits No. 14 and No. 15 are used to select a desired band or band row of three bands on a single track.

On the other hand, a sector register 24 serves to store the lower bits of the band register 23, capable of being in time sequence selected, i.e. the bits No. 0 to No. 4 (see FIG. 3).

A bit counter 25 serves to count the bit clock signals from a clocking circuit 36 and to send a carry to a word counter 26 each time k bits are counted. The word counter 26 counts the carries from the bit counter 25 and sends a carry to a scale-of-three counter 41 each time $l$ words are counted. A sector counter 27 counts the carries from the scale-of-three counter 41. This sector counter 27 exhibits the same count for three continuous sectors, for example, three sectors 0 as shown in FIG. 1, since by means of the scale-of-three counter 41 the sector counter 27 receives one carry each time the word counter 26 delivers three carries.

A coincidence circuit 28 applies an output signal to the controller 21 to cause the starting of write- and read-operations when the count of the sector counter 27 becomes identical with the sector address specified by the processor 1 and stored in the sector register 24.

A modulator 31 serves to modulate the data for writing into NRZ (Non Return to Zero) or PM (Phase Modulation) signals. A write-amplifier 32 receives the output of the modulator 31. A read-amplifier 33 delivers a read signal such as NRZ or PPM signals which is, in turn, demodulated through a demodulator 34 into data for reading.

The clocking circuit 36 electronically processes the timing signal which is read out of the drum MD and amplified through a timing amplifier 35, to produce a signal free from jitter.

A second coincidence circuit 42 selects, in time sequence, specified one of band or band row of the three bands $\alpha$, $n+\alpha$ and $2n+\alpha$ on the same track $\alpha$ upon identification of the coincidence between the output of the scale-of-three coupler 41 and the two uppermost bits of the band register 23 (see FIG. 3).

AND gates 43 and 44 respectively pass the content of the memory register 22 to the modulator 31 and the content of the demodulator 34 to the memory register 22, only during the time corresponding to the band row specified as above.

The above-mentioned buffer register 45 stores data per one sector during the time corresponding to the specified band row and transfers the data during the time corresponding to the remaining band rows. The buffer register 45 may store data per one sector during the time corresponding to the specified one of the three band rows and transfer the data during the time corresponding to the three band rows.

As described above, each track contains three bands which each consists of $m$ sectors, i.e. sectors 0, 1, ..., $m-1$, which are respectively arranged two sectors apart; the carries from the word counter are applied through the scale-of-three counter to the sector counter; and any one of the bands or band rows on the same track is selected by identifying the coincidence between the output of the scale-of-three counter and the two uppermost bits of the band register. With this constitution, therefore, the idle area can be effectively minimized. For example, with a magnetic drum each track of which can consist of 100 sectors, the idle area can be reduced to four sectors by forming one track with three bands and forming one band with 32 sectors.

In the above embodiment, 32 sectors made up a single band and the scale-of-three counter was used. However, for a band consisting of 16 sectors a scale-of-six counter must be used and for a band consisting of eight sectors a scale-of-twelve counter has to be employed.

In the embodiment shown in FIG. 2, the rate of data transfer on macroscopic scale is reduced by a factor of one-third, in the transfer of data stored in more than two continuing sectors, but this embodiment is preferable in case where a high-speed, high-density magnetic drum is mated with a rather low speed processor.

FIG. 4 shows another arrangement of data stored on the magnetic drum according to the present invention, with which the rate of data transfer is prevented from being lowered.

Also in this embodiment, the relation of words to a sector or bits to a word is the same as in the conventional method, and, one track consists of three bands, one band consists of 32 sectors, one band consisting of sectors whose number is equal to $2^5$. With the data arrangement as shown in FIG. 4, the addressing of the bands is performed in such a manner that one band address is designated on a 1/M circumference of the corresponding track while the next band address is designated on the next 1/M circumference of the next track.

According to this embodiment, therefore, even in case of transferring data stored in more than two successive sectors the rate of data transfer is not lowered since the band gap between the adjacent blocks, e.g. block 1 and block 2 or block 2 and block 3, is negligible.

Figure 5:
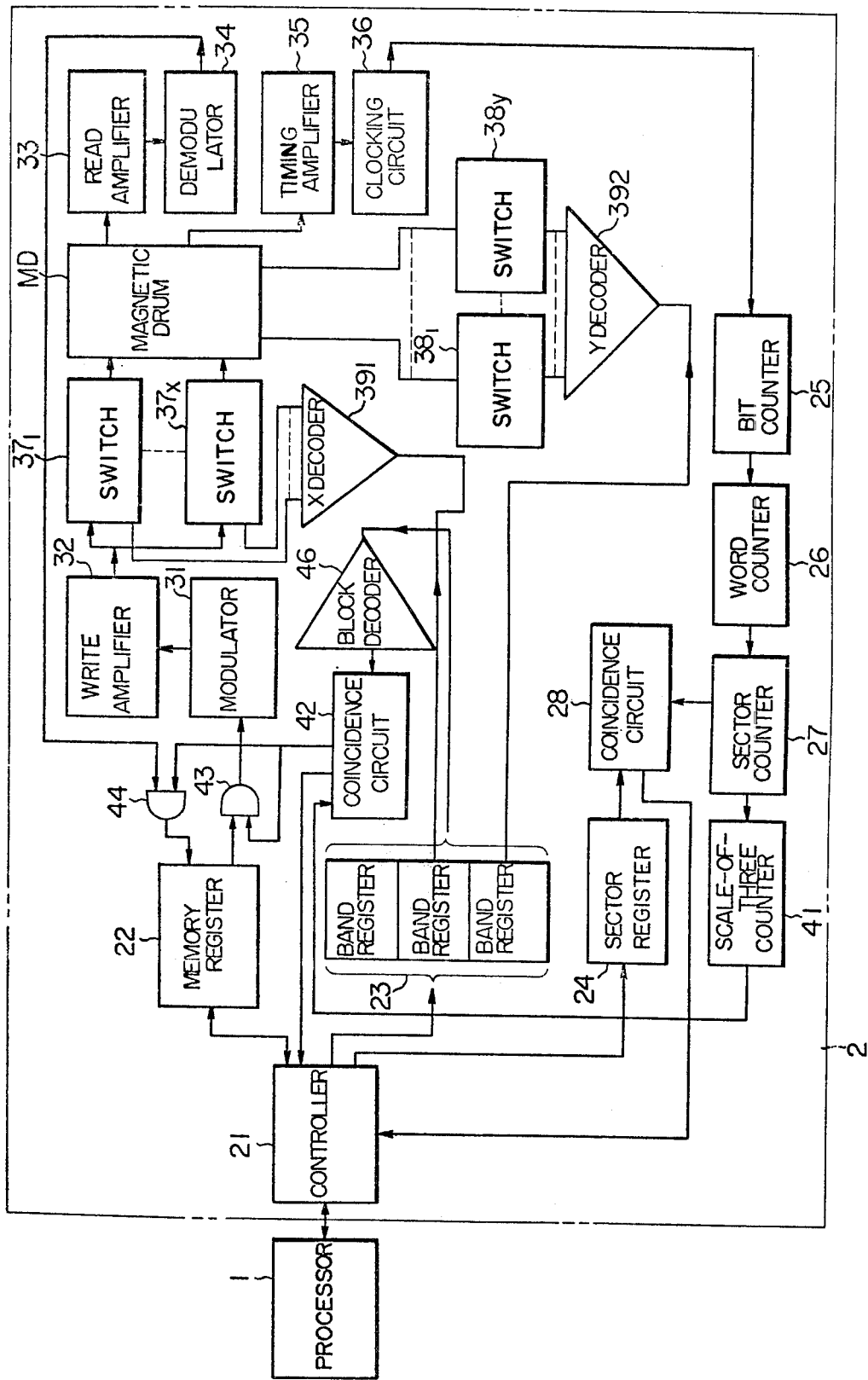
FIG. 5 is the block diagram of a circuit for obtaining such a data arrangement as shown in FIG. 4.

FIG. 5 is a block diagram of a circuit for realizing the data arrangement as shown in FIG. 4. In FIG. 5, the same reference numerals and characters are applied to like parts or elements as in FIG. 2. A block decoder 46 decodes the output of the band register 23 to determine the allotment of the bands to the respective blocks, as shown in FIG. 4. The coincidence circuit 42 applies an output to the controller 21 when the outputs of the scale-of-three counter 41 and the block decoder 46 are identical with each other, so that the read- or write-operation is started. And simultaneously (at this time only) the AND gates 43 and 44 are opened to transfer the content of the memory register 22 to the modulator 31 or the content of the demodulator 34 to the memory register 22.

As described above, each track contains 3 bands which each consists of $2^p$ sectors which are successively arranged on the corresponding track; the addressing of the bands is performed in such a manner that one band address is designated on a 1/M circumference of the corresponding track while the next band address is designated on the next 1/M circumference of the next track; and the register for specifying the band addresses serves to select not only any one of the tracks but also any one of the three bands (in this case equivalent to "three blocks") on a single track. With this constitution, therefore, the idle area can be considerably decreased without lowering the rate of data transfer.

In the foregoing part of the specification, the present invention is described by way of two embodiments. In addition, the following advantages can be obtained according to the present invention.

1. The idle area occupying about 10 to 50% of the magnetic layer of the drum and left unused, can be effectively utilized so that the cost per capacity of memory in the magnetic-drum storage device can be considerably lowered.

2. Each band can be constituted of sectors whose number is equal to $2^p$ though each track contains sectors whose number is not equal to $2^{p'}$ ($p'$ = positive integer). Accordingly, the addressing can be facilitated.

3. The rate of data transfer can be lowered, if necessary. If the increase of the rate of data transfer is desired, one word or one sector may be recorded in a divided form on a plurality of tracks and the one word or the one sector recorded on the plurality of tracks may then be read simultaneously. In this case, a group of the plurality of tracks corresponds to one track described or shown in the above-mentioned embodiments.

I claim:

1. A method comprising the steps of providing a sector type of magnetic memory having thereon $2^q$ tracks ($q$ = positive integer), forming each of said tracks with M bands (M > 2) with each band consisting of $2^p$ sectors ($p$ = positive integer), and addressing said bands and said sectors to address the magnetic memory.

2. A method as claimed in claim 1, wherein each band consists of $2^p$ sectors which are respectively arranged M−1 sectors apart on the corresponding track.

3. A method as claimed in claim 1, wherein each band consists of $2^p$ sectors which are successively arranged on the corresponding track and the addressing of said bands is performed by designating one band address on a 1/M circumference of the corresponding track and designating the next band address on the next 1/M circumference of the next track.

4. A method as claimed in claim 1, wherein the bands on each track as well as the tracks are selected according to the band addresses.

5. A method as claimed in claim 2, wherein the tracks are selected according to the several lower bits of a band register for specifying the band addresses while the bands on each track are selected according to the several remaining upper bits of said band register.

6. A method as claimed in claim 3, wherein the tracks are selected according to the several lower bits of a band register for specifying the band addresses while the bands on each track are selected according to the content of said band register including the several remaining upper bits.

7. A method comprising the steps of providing a sector type of magnetic memory having thereon $2^p$ tracks ($q$ = positive integer), forming each of said tracks with M bands (M > 2) with each band consisting of $2^p$ sectors ($p$ = positive integer), and addressing said bands and said sectors to address the magnetic memory, the sectors in each band being respectively arranged M−1 sectors apart on the corresponding track, the tracks being selected according to the several lower bits of a band register for specifying the band addresses, the bands on each track being selected according to the coincidence between the several remaining upper bits of said band register and the content of a scale-of-M counter counts M outputs from a word counter for producing an output each time said word counter counts $l$ outputs from a bit counter for producing an output each time said bit counter counts $k$ clock signals from the magnetic memory, and the sectors in each band being selected according to the coincidence between the content of a sector register for specifying the sector addresses and that of a sector counter for counting outputs from said scale-of-M counter.

8. A method comprising the steps of providing a sector type of magnetic memory having thereon $2^q$ tracks ($q$ = positive integer), forming each of said tracks with M bands (M > 2) each band consisting of $2^p$ sectors ($p$ = positive integer) and addressing said bands and said sectors to address the magnetic memory, the sectors in each band being successively arranged to the corresponding track, the addressing of said bands being performed by designating one band address on a 1/M circumference of the corresponding track and designating the next band address on the next 1/M circumference of the next track, the tracks being selected according to the several lower bits of a band register for specifying the band addresses, the bands on each track being selected according to the coincidence between the output of a decoder for decoding the content of said band register and the content of a scale-of-M counter for producing an output each time said scale-of-M counter counts M outputs from a sector counter for producing an output each time said sector counter counts $2^p$ outputs from a word counter for producing an output each time said word counter counts $l$ outputs from a bit counter for producing an output each time said bit counter counts $k$ clock signals from the magnetic memory, and the sectors in each band being selected according to the coincidence between the content of a sector register for specifying the sector addresses and that of said sector counter.

9. A method as claimed in claim 1, wherein each track extends along a line in a predetermined direction and forming each band of a corresponding track to extend along the same line in the same predetermined direction.

10. A method as claimed in claim 9, further comprising forming the bands of a corresponding track such that at least one sector of each band is sequentially arranged to extend along the same line in the same predetermined direction of the track thereof.

11. A method as claimed in claim 1, wherein the memory is a drum memory and forming the tracks and bands to extend about the circumference of the drum.

12. A method comprising the steps of providing a sector type of magnetic memory having thereon $2^q$ tracks ($q$ = positive integer), forming each of said tracks with M bands (M > 2) with each band consisting of $2^p$ sectors ($p$ = positive integer), and addressing said bands and said sectors to address the magnetic memory, the sectors in each band being respectively arranged M−1 sectors apart on the corresponding track, the tracks being selected according to selected bits of a band register for specifying the band addresses, and the bands on each track being selected according to the content of the remaining bits of said band register and that of a scale-of-M counter for counting the number of sectors.

13. A method as claimed in claim 12, wherein the sectors in each band are selected according to the content of a sector register for specifying the sector addresses and that of a sector counter for counting outputs from said scale-of-M counter.

14. A method comprising the steps of providing a sector type of magnetic memory having thereon $2^q$ tracks ($q$ = positive integer), forming each of said tracks with M bands (M > 2) with each band consisting of $2^p$ sectors ($p$ = positive integer), and addressing said bands and said sectors to address the magnetic memory, the sectors in each band being successively arranged to the corresponding track, the addressing of said bands being performed by designating one band address on a 1/M circumference of the corresponding track and designating the next band address on the next 1/M circumference of the next track, the tracks being selected according to selected bits of a band register for specifying the band addresses, and the bands on each track being selected according to the content of said band register and that of a scale-of-M counter for counting the number of the bands.

15. A method as claimed in claim 14, wherein the sectors in each band are selected according to the content of a sector register for specifying the sector addresses and that of a sector counter for counting the number of the sectors.

* * * * *